United States Patent [19]

Seiter

[11] 3,967,579

[45] July 6, 1976

[54] TELLTALE DEVICE

[75] Inventor: Charles Seiter, Los Angeles, Calif.

[73] Assignee: Stanton H. Kaye, Venice, Calif. ; a part interest

[22] Filed: Oct. 29, 1975

[21] Appl. No.: 627,021

[52] U.S. Cl. ............................... 116/114.5; 73/356; 73/358; 426/88
[51] Int. Cl.² ........................................ G01K 11/08
[58] Field of Search ........... 73/358, 356; 116/114.5; 426/88; 252/408

[56] References Cited
UNITED STATES PATENTS

| | | | |
|---|---|---|---|
| 2,614,430 | 10/1952 | Ballard | 73/358 |
| 3,055,759 | 9/1962 | Busby | 116/114.5 |
| 3,175,401 | 3/1965 | Geldmacher | 116/114.5 |
| 3,243,303 | 3/1966 | Johnson | 426/88 |
| 3,362,834 | 1/1968 | Kaye | 116/114.5 |
| 3,665,770 | 5/1972 | Sagi | 116/114.5 |
| 3,695,903 | 10/1972 | Telkes | 116/114.5 |
| 3,765,243 | 10/1973 | Pickett | 116/114.5 |
| 3,871,232 | 3/1975 | Pickett | 116/114.5 |
| 3,895,523 | 7/1975 | Nollen | 116/114.5 |

*Primary Examiner*—S. Clement Swisher
*Assistant Examiner*—Denis E. Corr
*Attorney, Agent, or Firm*—Fulwider Patton Rieber Lee & Utecht

[57] ABSTRACT

A telltale device for perishable products including a layer of temperature sensitive material having a clearly defined melting point and an indicator layer separated by a diffusion barrier formed of natural and synthetic gels which permits diffusion of the temperature sensitive material through the barrier at a controlled rate for contact with the indicator after a prescribed period of time at or above the melting point of the material. The temperature sensitive material and diffusion rate of the barrier are selected so that the device, when affixed to a product, visually indicates if the product has been held at or above its deterioration temperature for sufficient period to affect the quality of the product.

9 Claims, 3 Drawing Figures

TELLTALE DEVICE

BACKGROUND OF THE INVENTION

The present invention relates to a telltale device for perishable goods and more particularly to a device for the visual indication that a pre-selected temperature has been reached or exceeded for a predetermined time.

Many materials, such as for example, film, pharmaceutical and biological products and the like, must be stored under prescribed conditions of temperature in order to retain the freshness or effectiveness of the product. If the storage temperature or critical temperature of the product is exceeded for a definite period of time, the material will deteriorate or otherwise be adversely affected. In addition, many products, even if stored at or below their critical temperature, will deteriorate or lose freshness and should not be used after a prescribed period of time. Often, however, the appearance of the product is such that the consumer or user cannot determine whether the product has been properly stored or is still in a useful condition at the time of purchase or selection for use.

Various temperature indicators or telltales have been developed to indicate the temperature history of a product. Typically, these devices include a temperature sensitive material which flows at or above a pre-selected temperature for contact with a suitable indicator material to visually indicate that the carrier has been in a fused state. In some cases, mechanical means, such as a ball or the like, is supported in a temperature sensitive material and upon fusion the mechanical means changes position to provide a positive indication that a temperature has been exceeded.

These devices, however, can only indicate a change of state due to temperature. However, temperature alone is not ordinarily determinative of a product's condition and normally, it is the total time above a critical temperature which determines the condition of a product. Thus, for example, photographic film will deteriorate over a period of time even if properly stored and it is substantially impossible to determine the freshness of the film without actually using it, often with disastrous results.

Some prior art telltale devices have been designed to relate time and temperature. One such device is disclosed in U.S. Pat. 2,782,749 and is based on the use of temperature sensitive materials having non-specific melting points, such as fats and waxes, which gradually become less viscous as temperature increases. These temperature sensitive materials are formed as a layer on a porous paper barrier and at or above a predetermined temperature, the fat or wax begins to diffuse through the paper barrier and eventually reaches a point of visibility on the opposite side of the barrier. The rate of diffusion of the material through the barrier is directly related to the temperature. Devices of this type, due to the nature of fats and waxes, have a relatively narrow temperature range at which they can be used and it is difficult to control the diffusion rate through the paper barrier. In addition, the paper barrier must be relatively thick, on the order of 0.75 inches, so that the device is relatively bulky, thus giving rise to handling and storage problems when attached to packages or containers.

The present invention overcomes the deficiencies of the prior art and provides an improved telltale for product packages and the like for indicating the period of time at which the package and its contents have been at or have exceeded a predetermined temperature. The device of the present invention is adaptable for use through a wide range of temperatures and time periods.

SUMMARY OF THE INVENTION

The present invention resides in a telltale for attachment to packages on containers of perishable goods or the like which comprises a layer of temperature sensitive material separated from an indicator layer by a diffusion barrier which permits the diffusion of the temperature sensitive material at a controlled rate into or through the barrier at or above the predetermined critical temperature for contact with the indicator after a predetermined time at or above the critical temperature. The contact is visually indicated by a change in appearance of the indicator, normally a color change. Accordingly, products which are perishable or whose properties may deteriorate over a period of time above a critical temperature can be positively identified using the device of the invention without the necessity of opening a package or trying the product. The present invention is particularly useful for chemical and food product as well as for biological and pharmaceutical products to identify spoiled or otherwise unsuitable products or to identify products which have been stored beyond a permissible period of time.

More particularly, a diffusion barrier of controlled permeability separates a reactant layer of a temperature sensitive material, hereinafter referred to as carrier material, and a layer comprising suitable indicator for the material. The carrier material is selected on the basis of having a melting point substantially at the critical temperature above which a particular product should not be exposed beyond a certain period of time so that when the critical temperature is exceeded, the carrier material fuses and begins to diffuse at a controlled rate through the barrier. In cases where the temperature sensitive material itself is non-reactive with the indicator, a suitable reactant is admixed with the material and carried to the barrier by the material.

The diffusion barrier comprises a gel in which the solid phase is dispersed in a suitable liquid phase, preferably the carrier material. The rate of diffusion of the carrier material through the barrier is readily controlled by the concentration of the solid phase of the gel. Accordingly, the diffusion rate can be controlled without necessarily changing the dimensions of the diffusion barrier and the requirement for thick, bulky diffusion barriers is avoided. In addition the rate of diffusion of a material through the barrier is repeatable between individual units so reliable units can be produced in substantially large numbers.

In preferred embodiment of the invention, the diffusion barrier and layer of carrier material are encased within a transparent plastic material, one exterior surface of which may include a layer of adhesive for attachment of the device to a container or package. The indicator is fused or bonded directly to the interior surface of the plastic casing material on the opposite side of the diffusion barrier. The indicator may alternately be admixed in carrier material and comprise a separate layer on the side of the barrier opposite the carrier and reactant layer. In such a case, diffusion occurs through both surfaces of the barrier and the visual indication occurs within the barrier structure.

Other advantages of the present invention reside in the simplicity and sturdiness of the indicator device and its inexpensiveness and easy manufacture making it amenable for use on even low profit but perishable materials such as certain dairy products and the like. In addition, the present invention permits the use of wide variety of carrier materials of different melting points so that devices may be constructed in accordance with the present invention for use over a wide range of temperature. Moreover, the nature of the diffusion rate independently of temperature so that devices can be constructed having low temperature-high diffusion rates or alternatively, high temperature-low diffusion rates.

These and other advantages and features of the present invention will become apparent from the following detailed description taken into conjunction with the drawings and from the appended claims.

DESCRIPTION OF THE INVENTION

Figure 1:
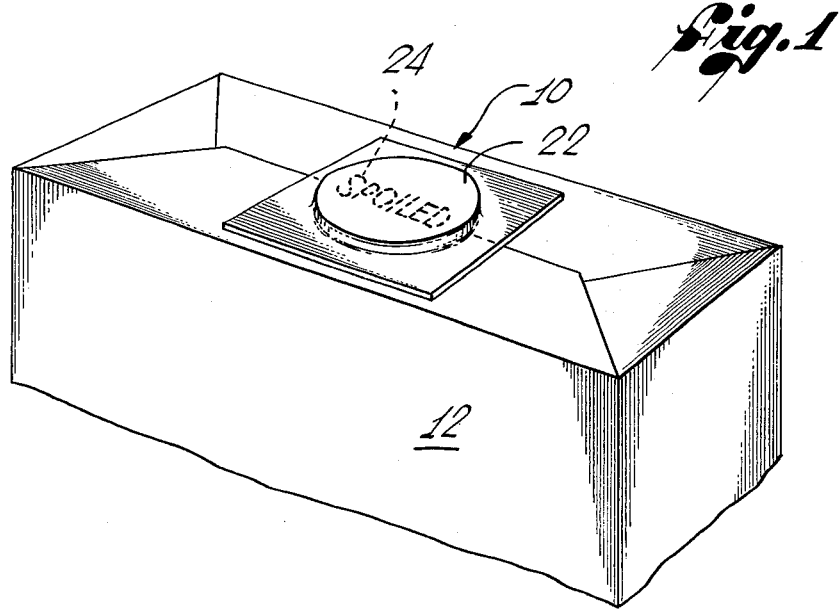
FIG. 1 is a perspective view of a temperature indicating device embodying the present invention illustrating it affixed to the top of a package, portions of the package being broken away for compactness of illustration.

Referring to the drawings and FIG. 1 in particular, a telltale device, shown generally as 10, is attached to the upper end of the package 12, such as for example a container for film, the contents of which are adversely affected if maintained above a critical temperature for an excessive period of time. Some types of film, for example, are very sensitive to temperature and will deteriorate at room temperature within a few days. In the case of film one normally cannot determine the condition of the film until it has been exposed and developed. X-ray film and certain self-developing film fall into this category and valuable, irreplacable exposures are lost due to deteriorated film. Similarly, whole blood should not be kept more than 21 days even if stored at the proper temperature of between 4°C and about 6°C. However, it is difficult to tell if the whole blood has been stored beyond a permissible time limit or has been, at some point, exposed above proper storage temperature for sufficient time to adversely affect the blood and then re-refrigerated to proper temperature. As used herein, the critical temperature may either be a temperature at which the product begins to deteriorate or may be a storage temperature at which the product should not be held for more than a prescribed period of time.

In accordance with the present invention, the temperature indicator 10 is adapted for the indication of periods of time at or above a critical temperature, particularly temperatures in the range of from about 0°C to about 40°C, which represents the temperature range of greatest commercial interest. However, by proper selection of materials, the device can operate at temperatures below 0°C and about 40°C.

Figure 2:
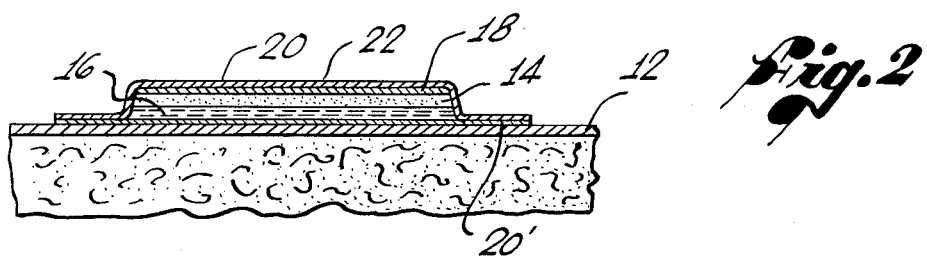
FIG. 2 is an enlarged sectional view taken through line 2—2 of FIG. 1.

As is most clearly shown in FIG. 2, the device 10 comprises a disk-shaped diffusion barrier 14 which separates an underlying reactant layer 16 of a temperature sensitive carrier material and an upper layer 18 of a suitable indicator material, discussed in more detail below. The layer 16 can also include a reactant material which is carried therewith through the diffusion barrier 14 for visually showing diffusion of the reactant to the indicator layer 18 if the temperature sensitive material itself is non-reactive. The proportions of reactant in the layer 16 are not critical although it is preferred to use only the amount necessary to provide the desired indicator change without unduly affecting the fusion temperatures of the carrier material.

The layers 14, 16 and 18 are secured between sheets 20 and 20' of film such as, for example, cellulose, cellulose acetate, oriented polyesters and the like. That portion of the film 20 overlying the layers 14, 16 and 18 is transparent so that a face 22 is provided for observing the layer 18. In the embodiment shown, the layer 18 is bonded or "printed" to the undersurface of the layer 20 and the layer may be arranged so as to define a pattern, such as letters 24, to even more clealy indicate to the observer that the product has been maintained above a critical temperature for an excessive period of time. The exterior surface of the lower film 20' is preferably coated with an adhesive for securing the device 10 onto the package 12.

The thicknesses of the layers 14 and 16 is not critical although in the interests of forming a compact device of minimum dimensions, it has been found that layers on the order of 1 millimeter in thickness provide excellent results. Likewise, the thickness of the layer 18 is not critical and when attached directly to the undersurface of the film 20, the layer may be extremely thin, on the order of a few angstroms.

As previously described the reactant layer 16 comprises a carrier material having a melting point substantially at the critical temperature of a particular product. The carrier material is preferably non-toxic, particularly where the device 10 is to be used in connection with food or medical products. The carrier material preferably has a specific melting point and is compatible with the reactants and indicators discussed below.

Hydrocarbons are particularly useful substances from which a carrier material can be formed and included are alkanes having between 14 and 25 carbon atoms, alkyl alcohols and acids having between 8 and 18 carbon atoms and esters formed between the alkyl alcohols and acids and alkyl and aryl alcohols and acids. In addition, aryl compounds are useful carrier materials. Thus, for example, p-xylene, actophenone and dibenzyl ether have melting points within the range of critical temperatures of primary interest. In addition, to the foregoing, short chain acids such as formic acid and acetic acid are useful carrier materials as well as water. Listed below are some representative carrier materials and their melting points.

TABLE A

| Carrier Material | Melting Point |
| --- | --- |
| Water | 0°C |
| Dibenzyl ether | 3.6°C |
| Tetradecane | 5.5°C |
| Decyl Alcohol | 7.0°C |
| Formic acid | 8.4°C |
| Myristic acid-ethyl ester | 11.0°C |
| Nonoic acid | 12.5°C |
| p-xylene | 13.0°C |
| Acetic acid | 16.6°C |
| Hexadecane | 20.0°C |
| Acetophenone | 20.0°C |
| Dodecyl Alcohol | 24.0°C |

TABLE A-continued

| Carrier Material | Melting Point |
|---|---|
| Octadecane | 27.0°C |
| Decanoic acid | 31.0°C |
| Pentacosane | 54.0°C |

The foregoing list is exemplary only and carrier materials having lower and higher melting points may be employed where the critical temperature of a product so requires. As is well known in the art, the melting point of the carrier material, particularly the hydrocarbons, can be adjusted by the addition of suitable proportions of an impurity material which serves to depress or raise the melting point of the carrier material. In this manner the melting point of the carrier material can be adjusted to conform to the critical temperature of the product for which the device 10 is designed to be used.

As mentioned, a reactant-indicator system is provided for visually signalling when a preselected period of time at or above the critical temperature has been reached. In FIG. 2, the indicator is disposed on the opposite side of the diffusion barrier as layer 18, preferably bonded to the undersurface of the plastic film 20. The relative positions of the reactant and indicator in the device 10 may, of course, be reversed and orientation of the device 10 does not affect its operation.

The choice of reactant and indicator is largely dependent on the nature of the carrier material and the compatibility of the reactant or indicator with the carrier. It is desirable that the indicator or reactant be compatible with the carrier material so as to be readily dispersible or soluble in the carrier material to prevent any substantial sparation of the reactant or indicator from the carrier material during diffusion through the barrier 18. For example, an acidic or basic aqueous solution can be used as the carrier material and in such a case, the acid or base forms the reactant while the indicator is elected from an acid-base indicator such as phenol phthalein, alizarin, methyl orange or the like. Where alkanes are utilized as the carrier material, an organic acid, for example, lauric acid, capric acid or caprylic acid or an organic base, for example, lauryl diethyl amine can be admixed with the hydrocarbon carrier material in minor proportions. In such a case an acid-base indicator, such as for example, dimethyl yellow, bromcresol green or cresolphthalein, can be utilized. In the case where an alkyl acid is used as the carrier material, it will not be necessary to introduce a separate reactant where an acid-base indicator is utilized since the alkyl acid itself will react with the indicator to effect the desired color change.

In addition to the pH sensitive indicator-reactant systems described above, other systems can be utilized with good results such as for example, systems based on a complex formation which produces a distinct color change in the indicator material. An example of such a system is the use of ethylene diaminetetraacetic acid (EDTA) as an indicator which forms a brightly colored complex with transition metal compounds, for example, $Co(NH_3)_6^{3+}$, which can be admixed in the carrier material layer 16. An advantage of using EDTA indicator resides in the fact that EDTA can be covalently bonded directly to the inner surface of the film sheet 20 and in effect can be printed on the sheet. preferably, the indicator is bonded on the sheet 20 in a pattern such as represented by the letters 24 of the device 10 which will be observed as a brightly colored word "spoiled" across the transparent face 22 when the carrier material has diffused through the barrier 14.

In addition, other complexing systems, such as the formation of charge-transfer complexes and reactions based on the formation of highly visible precipitates can be utilized to provide the desired visual indication. The acid-base systems described above are preferred since they are the simplest to utilize for manufacturing purposes and are highly reliable.

The diffusion barrier 14 comprises gel material through which the diffusion rate of the carrier material is closely controlled. Various materials can be utilized as the diffusion barrier including natural materials such as agar, agarose, pectin, gelatine and the like which form aqueous gels of various degrees of diffusability based upon the concentration of the gel former material. The synthetic gel formers include, for example, polyacrylamide, polystryrene-divinyl benzene, polyvinyl acetate and the like. The liquid phase of the diffusion barrier comprise the same carrier material utilized in the carrier material layer and below the critical temperature at which the device is designed to operate the gel is frozen and becomes activated at or above the critical temperature.

The concentration of the solid phase in the liquid phase determines the diffusion rate of the carrier material through the diffusion barrier gel and is readily determined by the simple expedient of preparing diffusion barriers of various concentration and timing the rate at which the carrier material diffuses through the barrier at slightly above the critical temperature. For example, a 2% polyacrylamide gel having a thickness of 1 mm. will permit an aqueous NaOH solution (pH12) to diffuse in approximately 2 hours at temperatures above 0°C while a 25% polyacrylamide gel of the same thickness requires approximately 12 hours for diffusion of the same solution. Higher concentrations of polyacrylamide will form gels having even lower diffusion rates. Since diffusion is a physical phenomenon, it will be understood that the other natural and synthetic gel formers will form gels of substantially the same diffusibility as the polyacrylamide and will exhibit substantially the same change of diffusibility with change in concentration.

The thickness of the diffusion barrier also has a substantial effect on the total time required for the carrier to diffuse through the barrier. Preferably barrier thicknesses of about 1 millimeter are utilized so that the size and bulkiness of the device is maintained at a minimum. However, thicker or thinner thinner barriers may be utilized and the diffusion rate adjusted by increasing or decreasing the cross-linking or gel concentration of the material forming the barrier. In addition, for very long diffusion periods, i.e., on the order of several weeks or months, barrier thickness is normally increased in addition to using a high concentration gel.

The diffusion barrier is readily produced by admixing the gel former in desired concentration in a liquid phase consisting of fused carrier material in order to form the gel. Assembly of the diffusion barrier 14 between the indicator layer 18 and the reactant layer 16 is preferably carried out below the critical temperature to avoid any preliminary diffusion into the barrier prior to attachment of the device 10 to the package 12. Alternatively the gel former can be admixed with a first liquid which is subsequently leached or displaced by the carrier material ultimately forming the liquid phase of the gel. Additionally, the liquid phase of the gel may be a different material than that comprising the carrier material, it being essential, however, that the material be liquid at or above the critical temperature.

In the embodiment of the invention described in connection with FIGS. 1 and 2, the indicator layer 18 is bonded directly to the inner surface of the film sheet 20. In operation, the carrier material diffuses at or above the critical temperature at a controlled rate through the barrier 14 and upon contact with the indicator layer 18, the carrier material or reactant carried therewith causes a visible color change in the indicator to signal that the product to which the device is affixed has been maintained at or above its critical temperature for a sufficient period of time to adversely affect the freshness or effectiveness of the product.

Figure 3:
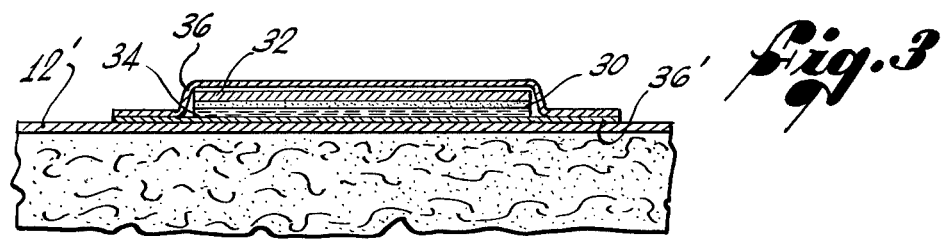
FIG. 3 is an enlarged sectional view of another embodiment of the device of the present invention.

As shown in FIG. 3, a modified form of the invention is attached to package 12' and includes a diffusion barrier 30 which separates layers 32 and 34 of the carrier material. Transparent plastic sheets 36 and 36' enclose and secure the barrier 30 and the layers 32 and 34. The layer 32 includes a separate reactant of the type described above and the layer 34 incorporates the indicator. Carrier materials which themselves react with the indicator are not used in this embodiment.

When the critical temperature is reached, both the layer 32 and the layer 34 are fused and begin to diffuse through the barrier 30. Contact between the reactant and indicator occurs within the barrier 30 approximately at its center plane and results in the entire barrier changing color. The diffusion rate or thickness of the barrier 30 is accordingly adjusted so that the selected period of time at or above critical temperature occurs when the carrier material has traveled approximately one-half of the thickness of the barrier, since both of the layers 32 and 34 diffuse into the barrier at approximately the same rate.

From the foregoing, it will be seen that the present invention provides a compact and economical device adapted for attachment to packages of perishable products and the like to provide a simple yet highly reliable method for monitoring the storage periods and temperatures of such products. In accordance with the present invention, the time period measured by the device is most readily controlled by the gel concentration of the diffusion barrier which permits repeatable and reliable diffusion times between individual devices without changing the physical dimensions or the composition of the barrier and by proper selection of the carrier materials in accordance with the invention, the device of the present invention operates over a wide range of critical temperatures. Accordingly, the present invention is suitable for use with a wide variety of products which deteriorate when held for a period of time above a critical temperature. For example, the present invention is particularly useful in connection with food products, certain pharmaceuticals and biological products and the like which deteriorate above a critical temperature or in many cases, lose their freshness or effectiveness over a period of time, even at proper storage conditions.

Although the foregoing invention has been described in detail by way of illustration and for purposes of clarity and understanding, it will be clear that certain changes and modifications may be practiced without departing from the spirit and scope of the invention as defined in the appended claims.

I claim:

1. A telltale device for indicating deterioration of perishable goods and the like, said device including:
    a first layer comprising a fusible carrier material having a clearly defined melting point substantially at a preselected critical temperature;
    a second layer comprising an indicator for visually indicating contact with said carrier material;
    a gel diffusion barrier disposed between said first and second layers for the diffusion of said carrier material therethrough at a preselected rate at and above the critical temperature for contact with said indicator thereby to visually indicate that said device has been maintained above the critical temperature for at least a preselected period of time as determined by the diffusion rate of the said carrier material in said barrier.

2. The telltale of claim 1 further including means for containing said first and second layers and said diffusion barrier and for attaching said telltale to a product, said means including a transparent face for viewing the interior thereof.

3. The telltale of claim 2 wherein said container means includes upper and lower transparent plastic films surrounding and securing said first and second layers and said gel diffusion barrier, the exterior surface of said lower film including an adhesive for securing said device to a product.

4. The telltale of claim 3 wherein said indicator layer is bonded to the interior surface of said upper film.

5. The telltale of claim 3 wherein said indicator layer consists of an admixture of a minor proportion of said indicator and a major proportion of the same carrier material utilized in said first layer and said first layer includes a minor proportion of a reactant for said indicator, said carrier material being inert with respect to said indicator.

6. The telltale of claim 1 wherein said material is selected from materials having clearly defined melting points in the range of between about 0°C and about 40°C.

7. The telltale of claim 1 wherein said carrier material further includes minor proportions of a reactant compatible therewith for effecting a visual reaction with said indicator of said second layer, said reactant being carried by said carrier material as it diffuses in said barrier.

8. The telltale of claim 1 wherein the solid component of said gel diffusion barrier is selected from the group of gel forming materials consisting of agar, agarose, pectin, gelatine, polyacrylamide, polystyrenedivinylbenzene copolymers and polyvinyl acetate, the diffusion rate of said carrier material in said gel diffusion barrier being directly related to the proportion of gel former.

9. The telltale of claim 8 wherein said gel former comprises between about 2% and about 25% by weight of said diffusion gel barrier.

* * * * *

UNITED STATES PATENT AND TRADEMARK OFFICE
CERTIFICATE OF CORRECTION

PATENT NO. : 3,967,579
DATED : July 6, 1976
INVENTOR(S) : Seiter, Charles

It is certified that error appears in the above-identified patent and that said Letters Patent are hereby corrected as shown below:

Column 2, line 27, "product" should be --products--;

line 34, after "comprising" insert --a--.

Column 3, line 8, after "of" insert --a--;

Column 4, line 18, after ""printed"" insert --directly--.

Column 5, line 36, "sparation" should be --separation--;

line 64, after "EDTA" insert --as the--;

line 67, "preferably" should be --Preferably--.

Column 6, line 52, "thinner" (second occurrence) should be --diffusion--.

Signed and Sealed this

Fourth Day of January 1977

[SEAL]

Attest:

RUTH C. MASON
Attesting Officer

C. MARSHALL DANN
Commissioner of Patents and Trademarks